US012559817B2

(12) United States Patent
Gu et al.

(10) Patent No.: US 12,559,817 B2
(45) Date of Patent: Feb. 24, 2026

(54) ELECTRO-VIBRATION COUPLED STRESS RELIEF SYSTEM AND METHOD FOR ELIMINATING RESIDUAL STRESS USING THE SAME

(71) Applicant: Shanghai Maritime University, Shanghai (CN)

(72) Inventors: Bangping Gu, Shanghai (CN); Jingshu Zhuo, Shanghai (CN); Zidi Jin, Shanghai (CN); Liqiang Gao, Shanghai (CN); Yongli Hu, Shanghai (CN); Xiong Hu, Shanghai (SH); Zilin Zhang, Shanghai (CN); Chuanxiao Yang, Shanghai (CN); Junshuo Wang, Shanghai (CN)

( * ) Notice: Subject to any disclaimer, the term of this patent is extended or adjusted under 35 U.S.C. 154(b) by 339 days.

(21) Appl. No.: 18/112,891

(22) Filed: Feb. 22, 2023

(65) Prior Publication Data

US 2024/0279765 A1       Aug. 22, 2024

(51) Int. Cl.
*C21D 10/00*          (2006.01)
*G05D 19/02*          (2006.01)

(52) U.S. Cl.
CPC .............. *C21D 10/00* (2013.01); *G05D 19/02* (2013.01)

(58) Field of Classification Search
CPC .................................. C21D 10/00; G05D 19/02
See application file for complete search history.

(56) References Cited

U.S. PATENT DOCUMENTS 11,327,054 B2 *   5/2022   Gu ...................... G01N 29/4472

FOREIGN PATENT DOCUMENTS

| CN | 106636608 B |   | 6/2018 |   |
|----|-------------|---|--------|---|
| CN | 109487073 A | * | 3/2019 | ............. C21D 10/00 |
| CN | 110760670 A | * | 2/2020 | ............. C21D 10/00 |
| CN | 112322888 B |   | 8/2022 |   |

OTHER PUBLICATIONS

Bangping Gu, et.al. [CN110760670A] (machine translation) (Year: 2019).*
Bangping Gu, et.al. [CN109487073A] (machine translation) (Year: 2019).*

* cited by examiner

*Primary Examiner* — Sally A Merkling
*Assistant Examiner* — Nazmun Nahar Shams
(74) *Attorney, Agent, or Firm* — Lei Jiang

(57)          ABSTRACT

The present invention discloses an electro-vibration coupled stress relief system, comprising a host computer, an arbitrary waveform card, a power amplifier, an electromagnetic exciter, an energy amplification device, an acceleration sensor, a charge amplifier, an oscilloscope, a power module, a charging module, an electric energy storage module, a discharge module, a pulse current sampling measurement module and a copper electrode. The present invention also discloses a method for eliminating residual stress, comprising the following steps: obtaining the natural frequencies of bending vibration of different orders by numerical modal analysis; fixing the metal structure; discharging the metal structure to generate high-energy electrical pulses by opening the charging switch and closing the discharge switch; inputting the analog excitation signal output by the arbitrary waveform card into the electromagnetic exciter via the power amplifier and driving the electromagnetic exciter to generate high-frequency vibration.

1 Claim, 10 Drawing Sheets

ELECTRO-VIBRATION COUPLED STRESS RELIEF SYSTEM AND METHOD FOR ELIMINATING RESIDUAL STRESS USING THE SAME

FIELD OF INVENTION

The invention relates to the field of residual stress elimination, in particular to an electro-vibration coupled Stress relief system and method for eliminating residual stress using the same.

BACKGROUND ART

In the field of mechanical processing and manufacturing, residual stress often occurs inside metal structure, and the existence of residual stress will cause warpage or distortion of parts, fatigue strength reduction, or even cracking, resulting in damage, which seriously affects the performance of metal structure. Therefore, how to effectively eliminate the residual stress of metal structure in the manufacturing process has important practical significance. At present, the commonly used residual stress relief methods include natural stress relief, thermal stress relief and vibration stress relief. Natural stress relief eliminates the residual stress of metal structure by applying repeated temperature stress to metal structure through the temperature change of day and night seasons. However, natural stress relief takes a long time, has low efficiency, and the process method is not easy to manage, which has been gradually eliminated; thermal stress relief is to eliminate the residual stress by placing the metal structure in the heating furnace and reasonably controlling the three processes of heating, heat preservation and cooling. However, thermal stress relief has high energy consumption, serious pollution and is not easy to deal with large metal structure. Vibration stress relief technology has the advantages of good treatment effect, short treatment time and low energy consumption, and is widely used in various fields of mechanical processing and manufacturing. Vibratory stress relief technology is also known as vibration elimination of residual stress technology. The principle is that the sum of the internal residual stress and the external vibration stress exceeds the yield limit of the material through vibration, and the trace plastic deformation is generated inside the material, so that the internal residual stress of the material can be reduced. Due to the principle limitation of vibration stress relief technology in eliminating residual stress, the effect of this technology is limited in eliminating residual stress of high strength materials. For example, the yield limit of the martensite high strength cold rolled steel plate is 1225.94 MPa, and the yield limit of the tin plate test steel plate is 762.31 MPa, which is published in the literature ' Experimental study on vibration stress relief reduction technology of residual stress of high strength steel plate'. Based on the vibration stress relief test platform, the effectiveness of vibration stress relief to eliminate the residual stress of high strength steel plate was studied. The results showed that the effect of vibration stress relief of high strength steel plate is obviously weaker than that of ordinary strength steel plate. The research results published in the literature showed that the effect of vibration stress relief on eliminating residual stress of high-strength metal materials is limited. The main reason is that the yield limit of high-strength metal materials is high. The sum of the applied vibration stress applied to metal structure and the initial residual stress of high-strength metal materials during vibration stress relief treatment cannot reach its yield limit or only exceed its yield limit, making it difficult for high-strength metal materials to produce plastic deformation, resulting in limited effect of vibration stress relief on eliminating residual stress of high-strength metal materials. If the yield limit of high strength metal materials can be reduced, the effect of eliminating residual stress by vibration stress relief can be improved. From the principle of vibration stress relief, reducing the flow stress of dislocation slip motion and improving the ability of plastic deformation in the process of vibration stress relief of high strength materials has become one of the effective ways to solve the problem of limited effect of vibration stress relief on regulating the residual stress of high strength materials. Studies have shown that the pulse current or electric field can directly transfer the electric energy to the microscopic particles inside the material, stimulate the movement of charged particles, form a ' micro-excitation' to the material, increase the thermal activation energy of dislocation slip movement, and reduce the flow stress of dislocation slip movement. That is to say, metal materials will exhibit softening phenomenon under the action of pulse current or electric field, which greatly improves the plastic deformation ability of metal materials, thereby reducing the yield limit of metal materials. In view of this, the invention combines pulse current with vibration stress relief technology, and proposes an electro-vibration coupled Stress relief system and method for eliminating residual stress using the same, aiming at improving the effect of vibration stress relief on eliminating residual stress of metal materials.

SUMMARY OF THE INVENTION

In order to improve the effect of vibration stress relief on eliminating residual stress of metal materials, the present invention proposes an electro-vibration coupled Stress relief system and a method for eliminating residual stress using the same.

The electro-vibration coupled stress relief system comprises a host computer, an arbitrary waveform card, a power amplifier, an electromagnetic exciter, an energy amplification device, an acceleration sensor, a charge amplifier, an oscilloscope, a power module, a charging module, an electric energy storage module, a discharge module, a pulse current sampling measurement module, a first copper electrode and a second copper electrode wherein.

The host computer system comprises a finite element numerical simulation module, a preferred excitation frequency determination module, a preferred excitation frequency reference voltage peak setting module, an excitation signal synthesis module, a voltage signal acquisition module for obtaining the voltage signal collected by the data acquisition card, a Fourier transform module for fast Fourier transform of voltage signals, an actual voltage peak acquisition module for obtaining each preferred excitation frequency point actual voltage peak from the fast Fourier transform, and a voltage peak difference storage module for storing the difference between the reference voltage peak and the actual voltage peak.

Further, the host computer converts a digital excitation signal into an analog excitation signal via the arbitrary waveform card, and the analog excitation signal output by the arbitrary waveform card is inputted into the electromagnetic exciter via the power amplifier.

Further, the energy amplification device is composed of a workbench, a frustum shaped connecting rod and a support platform; the workbench is connected with the support platform via the frustum shaped connecting rod; a cross sectional area of the frustum shaped connecting rod is less than a cross sectional area of the workbench, the cross sectional area of the frustum shaped connecting rod is less than a cross sectional area of the support platform; a length of the frustum shaped connecting rod is greater than a thickness of the workbench, a big end of the frustum shaped connecting rod is connected to the support platform, and a small end thereof is connected to the workbench, the support platform is fixed on an exciting table of a moving part of the electromagnetic exciter; the acceleration sensor is fixed on a lower surface of the workbench, the acceleration sensor is connected with the charge amplifier input channel, the charge amplifier output channel is connected with the oscilloscope input channel, and the oscilloscope output channel is connected with the host computer; the power module is arranged with a power switch and a step-up transformer, an input end of the step-up transformer is externally connected with a power frequency power supply via the power switch, an output end of the step-up transformer of the power module is connected with the input end of a full bridge rectifier circuit of the charging module, and a positive output end of the full bridge rectifier circuit of the charging module is connected with a charging switch, a negative output end of the full bridge rectification circuit of the charging module is connected with a negative input end of the electric energy storage module, the charging switch of the charging module is connected with a positive input end of the electric energy storage module, and a positive output end of the electric energy storage module is connected with a discharge switch of the discharge module, a negative output end of the electric energy storage module is connected with an adjustable inductance of the discharge module, the discharge switch of the discharge module is connected with the pulse current sampling measurement module, one end of the first copper electrode is connected with the pulse current sampling measurement module via cold pressing technology, and the other end is connected with the metal structure via bolt and nut; one end of the second copper electrode is connected with the adjustable inductance via cold pressing technology, and the other end is connected with the metal structure via bolt and nut.

Further, the full bridge rectifier circuit of the charging module is composed of four high-voltage rectifier silicon stacks; the electric energy storage module comprises a current limiting resistor and a high-voltage pulse capacitor bank, the current limiting resistor is capable of limiting a current protection of the capacitor bank and of changing a charging time of the capacitor bank by changing a resistance value of the current limiting resistor; the adjustable inductance of the discharge module is used to adjust an inductance of the discharge circuit to generate pulse oscillation waveform; the pulse current sampling measurement module includes a shunt and the oscilloscope, the shunt is used to detect the current in the discharge module, and the oscilloscope displays a current waveform of a high-energy electrical pulse generated via the discharge module.

The method for eliminating residual stress by using an electro-vibration coupled stress relief system of the present invention comprises the following steps:

step 1, establishing a finite element model of the metal structure by a finite element software in the host computer before an electro-vibration coupled stress relief treatment of the metal structure, obtaining natural frequencies of the bending vibration of the metal structure at various orders by numerical modal analysis of the metal structure; proceeding to step 2 on condition that the gravity of the metal structure is less than a driving force of the electromagnetic exciter; otherwise proceeding to step 4;

step 2, constructing a first clamping device: mounting a rotary handle in the form of a cylinder at one end of a pressure rod, connecting an insulating pressure block with the other end of the pressure rod in the form of a thread, connecting a ring sleeve on a 7-shaped boss with the pressure rod in the form of a thread, a bolt passes through the through hole of the inverted T-shaped boss, fixing a support column on a workbench of the energy amplification device, connecting an I-shaped insulating block with a T-shaped slot via sliding connection;

step 3, placing the metal structure on the I-shaped insulating block via the first clamping device, turning the rotary handle to drive the pressure rod to move downward, the insulating pressure block is in close contact with the upper surface of the metal structure to achieve the locking function, so as to fix the metal structure on the workbench of the energy amplification device; proceeding to step 6;

step 4, constructing a second clamping device: providing an insulating bottom plate between the workbench and the metal structure, the lower surface of the metal structure is in close contact with the workbench of the energy amplification device, and the gravity of the metal structure is borne by the support platform, so as to avoid the failure of the electromagnetic exciter due to the excessive gravity of the metal structure, placing the electromagnetic exciter in a square groove of the bottom plate, connecting a support rod and the bottom plate in the form of a thread, connecting a connecting rod and the support rod via sliding connection, and fixing an insulated U-shaped plate on the connecting rod, placing the electromagnetic exciter in a square groove of the bottom plate, connecting a support rod and the bottom plate in the form of a thread, connecting a connecting rod and the support rod via sliding connection; and fixing an insulated U-shaped plate on the connecting rod;

step 5, placing the metal structure on the insulating U-shaped plate;

step 6, closing the power switch and the charging switch, opening the discharge switch; charging the electric energy storage module, opening the charging switch after the electric energy storage module is fully charged, closing the discharge switch; converting the digital excitation signal into the analog excitation signal via the arbitrary waveform card, outputting the analog excitation signal by the arbitrary waveform card is inputted into the electromagnetic exciter via the power amplifier, driving the electromagnetic exciter to generate high-frequency vibration.

The beneficial effects of the present invention are as follows:

The method for eliminating residual stress by using an electro-vibration coupled stress relief system of the present invention has better residual stress elimination effect in comparison with prior art.

The method for eliminating residual stress by using an electro-vibration coupled stress relief system is controlled by the host computer in the electro-vibration coupled stress relief system, which not only reduces the workload, but also improves the working efficiency.

The method for eliminating residual stress by using an electro-vibration coupled stress relief system is applicable to a variety of gravity metal structure, and can ensure the safety of the experiment.

BRIEF DESCRIPTION OF DRAWINGS

In order to more clearly in this invention example of technical plan, the following will be used to implement case need introduce simply the appended drawings, should understand that the following chart shows only some of the present invention, therefore should not be regarded as the range of qualified for the field common technical personnel, on the premise of not giving creative labor. Other related drawings can also be obtained from these drawings.

Figure 1:
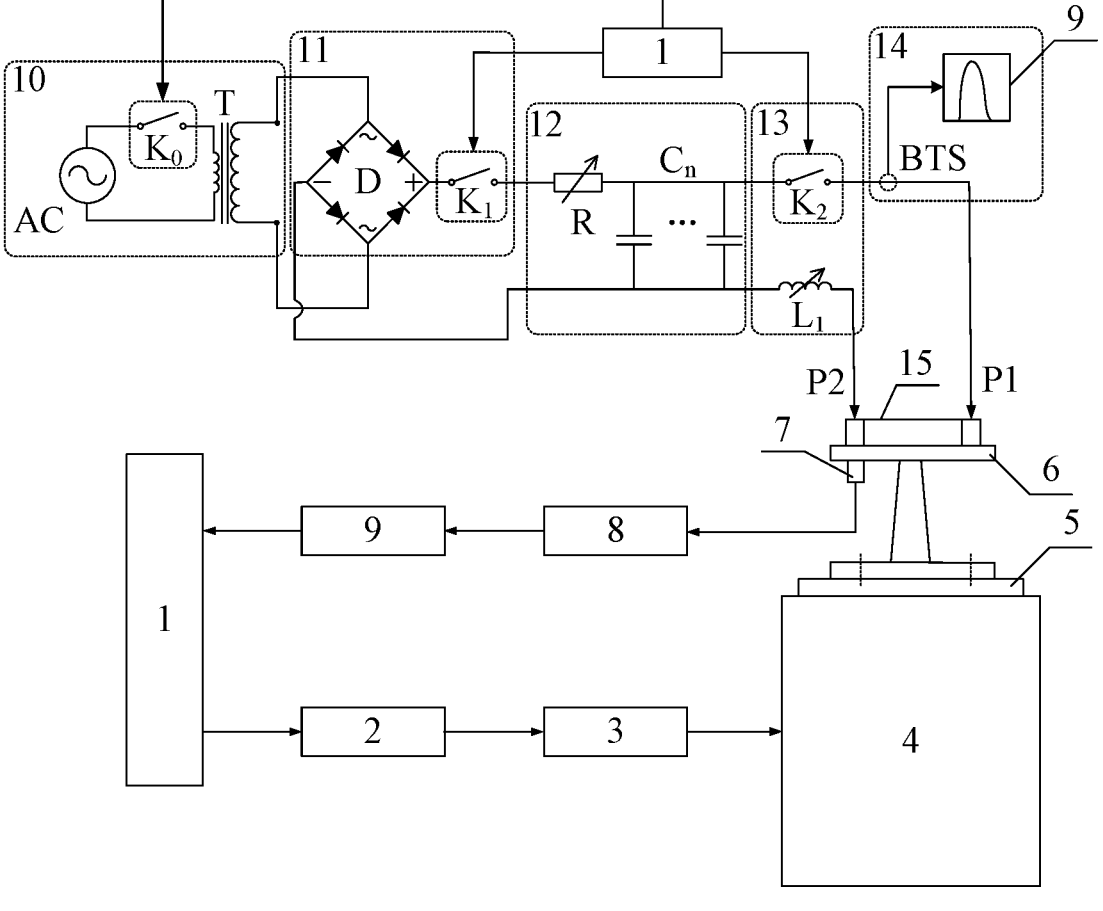
FIG. 1 is a schematic diagram of the electro-vibration coupled stress relief system of the present invention.
Figure 2:
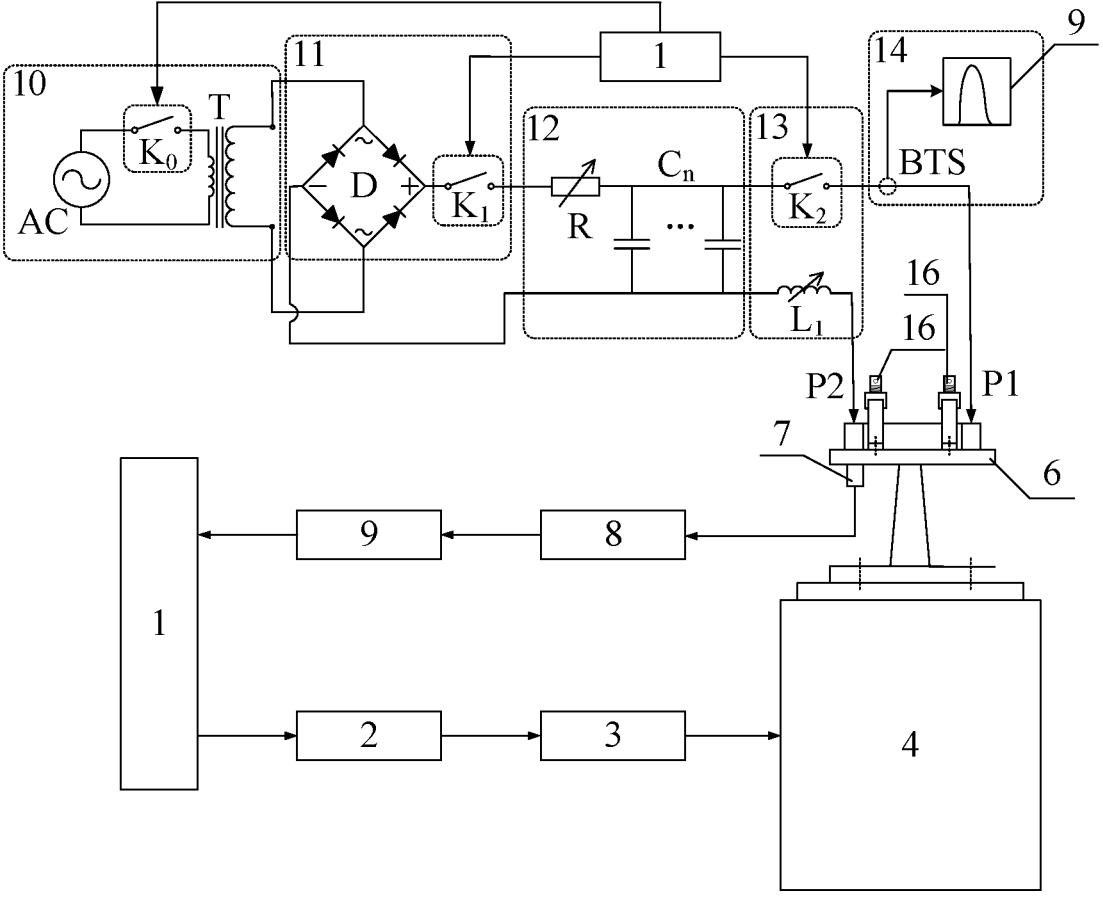
FIG. 2 is a schematic diagram of the electro-vibration coupled stress relief system of the present invention for eliminating residual stresses in low gravity metal structure.
Figure 3:
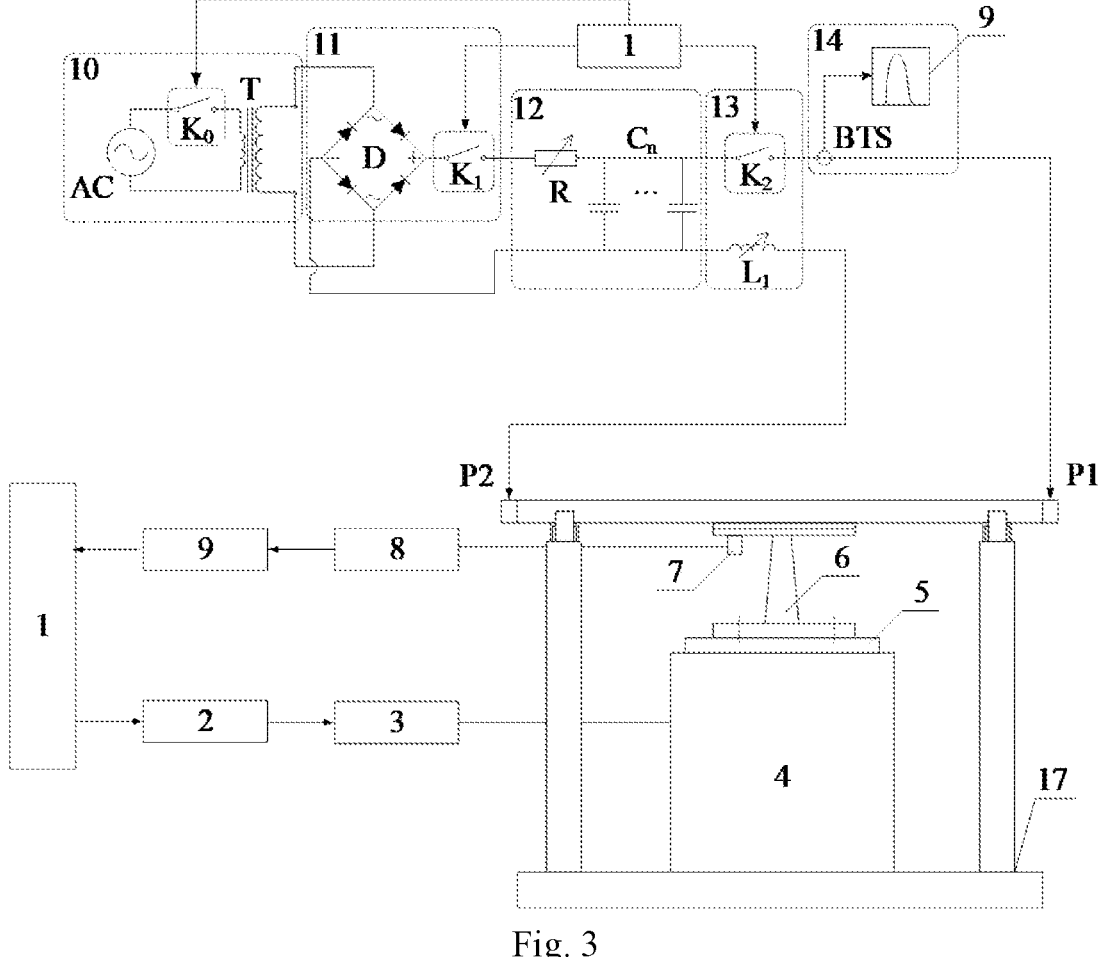
FIG. 3 is a schematic diagram of the electro-vibration coupled stress relief system of the present invention for eliminating the residual stress of heavy gravity metal structure.

The reference signs of the drawings are as follows: 1 stands for host computer; 2 stands for arbitrary waveform card; 3 stands for power amplifier; 4 stands for electromagnetic exciter; 5 stands for exciting table; 6 stands for energy amplification device; 7 stands for acceleration sensor; 8 stands for charge amplifier; 9 stands for oscilloscope; 10 stands for power module; 11 stands for charging module; 12 stands for electric energy storage module; 13 stands for discharge module; 14 stands for pulse current sampling measurement module; 15 stands for metal structure; 16 stands for first clamping device; 17 stands for second clamping device; 18 stands for insulating bottom plate; 19 stands for bolt; P1 stands for first copper electrode; P2 stands for second copper electrode; K0 stands for power switch; K1 stands for charging switch; K2 stands for discharge switch; Cn stands for capacitor bank; L1 stands for adjustable inductance.

EMBODIMENTS

Embodiments of the invention are described in detail below, and examples of said embodiments are shown in the attached drawings where identical or similar labels throughout indicate identical or similar elements or elements having the same or similar function. The embodiments described below by reference to the attached drawings are illustrative and are only used to explain the invention, not to be understood as limitations of the invention.

In the description of the invention, it is necessary to understand that the term "center", "vertical", "horizontal", "length", "width", "thickness" and "up", "down", "before" and "after", "left", "right" and "vertical", "level", "top", "bottom", "inside" and "outside", "clockwise" and "rotate", "axis", "radial" and "to the" instructions for the location or position relations. The orientation or position relations shown in the attached drawings are intended only to facilitate the description of the invention and simplify the description, and are not intended to indicate or imply that the device or component referred to must have a specific orientation, be constructed and operated in a specific orientation, and therefore shall not be construed as a limitation of the invention.

In addition, the terms "first" and "second" are used for descriptive purposes only and are not to be understood to indicate or imply relative importance or to indicate implicitly the quantity of indicated technical features. Thus, features that are qualified as "first" or "second" may include, explicitly or implicitly, one or more of these features. In the description of the invention, "multiple" means two or more, unless otherwise expressly and specifically qualified.

In the present invention, unless otherwise expressly specified and qualified, the terms "mounting", "connecting", "fastening", etc., shall be interpreted broadly, for example, as fixed connection, detachable connection, or integrated. It can be mechanical or electrical. It can be directly connected, or indirectly connected through an intermediate medium. It can be the internal connection of two components or the interaction of two components. For ordinary technicians in the field, the specific meanings of the above terms in the present invention can be understood according to the specific circumstances.

In the present invention, unless otherwise expressly specified and qualified, the first feature "above" or "below" the second feature may be in direct contact with the first and second features, or in indirect contact with the first and second features through an intermediate medium. Moreover, the first feature is "above", "above" and "above" the second feature, but the first feature is directly above or diagonally above the second feature, or merely indicates that the horizontal height of the first feature is higher than the second feature. The first feature "below", "below" and "below" the second feature can be either directly or diagonally below the second feature, or simply indicate that the horizontal height of the first feature is less than the second feature.

The invention relates to the field of residual stress elimination, in particular to an electro-vibration coupled Stress relief system and method for eliminating residual stress using the same, the method of the present invention has better residual stress elimination effect in comparison with prior art, the method for eliminating residual stress by using an electro-vibration coupled stress relief system is controlled by the host computer in the electro-vibration coupled stress relief system, which not only reduces the workload, but also improves the working efficiency, and the method is applicable to a variety of gravity metal structure, and can ensure the safety of the experiment.

Refer to FIG. 1, the electro-vibration coupled stress relief system of the present invention comprises a host computer 1, an arbitrary waveform card 2, a power amplifier 3, an electromagnetic exciter 4, an energy amplification device 6, an acceleration sensor 7, a charge amplifier 8, an oscilloscope 9, a power module 10, a charging module 11, an electric energy storage module 12, a discharge module 13, a pulse current sampling measurement module 14, a first copper electrode P1 and a second copper electrode P2.

Refer to FIG. 1, the host computer 1 converts the digital excitation signal into an analog excitation signal via the arbitrary waveform card 2, and the analog excitation signal output by the arbitrary waveform card 2 is inputted into the electromagnetic exciter 4 via the power amplifier 3.

Figure 4:
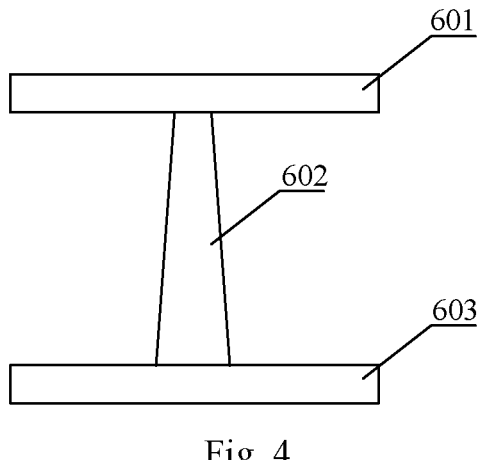
FIG. 4 is a schematic diagram of the energy amplification device of the present invention.
Figure 5:
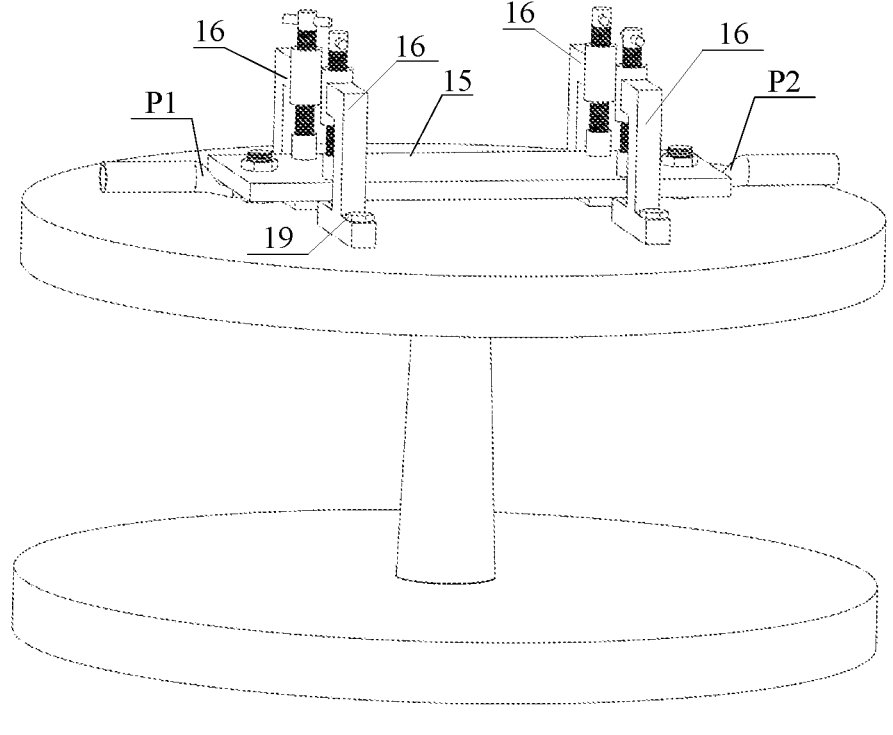
FIG. 5 is the first clamping device assembly diagram of the electro-vibration coupled stress relief system of the present invention.
Figure 6:
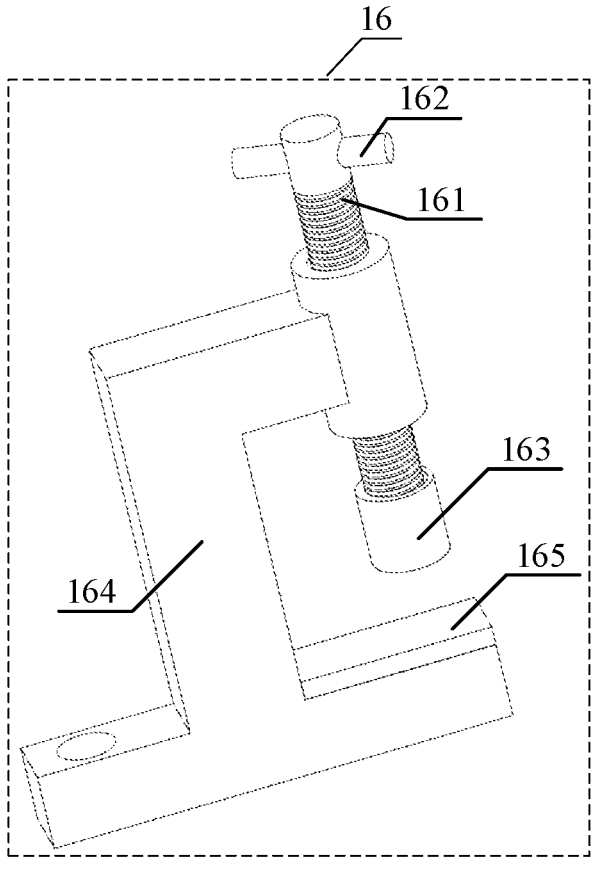
FIG. 6 is the first clamping device of the electro-vibration coupled stress relief system of the present invention.
Figure 7:
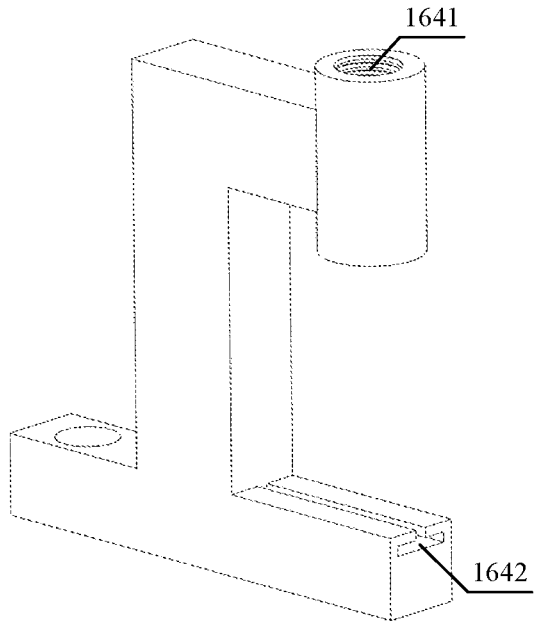
FIG. 7 is a schematic diagram of the supporting column of the clamping device of the electro-vibration coupled stress relief system of the present invention.

Refer to FIG. 1 and FIG. 4, The energy amplification device 6 is composed of the workbench 601, a frustum shaped connecting rod 602 and a support platform 603; the workbench 601 is connected with the support platform 603 via the frustum shaped connecting rod 602; the cross sectional area of the frustum shaped connecting rod 602 is less than the cross sectional area of the workbench 601, the cross sectional area of the frustum shaped connecting rod 602 is less than the cross sectional area of the support platform 603; the length of the frustum shaped connecting rod 602 is greater than the thickness of the workbench 601, the big end of the frustum shaped connecting rod 602 is connected to the support platform 603, and a small end thereof is connected to the workbench 601, the support platform 603 is fixed on the exciting table 5 of a moving part of the electromagnetic exciter 4; the acceleration sensor 7 is fixed on the lower surface of the workbench 601, the acceleration sensor 7 is connected with the charge amplifier 8 input channel, the charge amplifier 8 output channel is connected with the oscilloscope 9 input channel, and the oscilloscope 9 output channel is connected with the host computer 1; the power module 10 is arranged with a power switch K0 and a step-up transformer T, the input end of the step-up transformer T is externally connected with a power frequency power supply AC via the power switch K0, an output end of the step-up transformer T of the power module 10 is connected with the input end of the full bridge rectifier circuit D of the charging module 11, and a positive output end of the full bridge rectifier circuit D of the charging module 11 is connected with a charging switch K1, a negative output end of the full bridge rectification circuit D of the charging module K1 is connected with a negative input end of the electric energy storage module 12, the charging switch K1 of the charging module 11 is connected with a positive input end of the electric energy storage module 12, and a positive output end of the electric energy storage module 12 is connected with a discharge switch K2 of the discharge module 13, a negative output end of the electric energy storage module 12 is connected with an adjustable inductance L1 of the discharge module 13, the discharge switch K2 of the discharge module 13 is connected with the pulse current sampling measurement module 14, one end of the first copper electrode P1 is connected with the pulse current sampling measurement module 14 via cold pressing technology, and the other end is connected with the metal structure 15 via bolt and nut; one end of the second copper electrode P2 is connected with the adjustable inductance L1 via cold pressing technology, and the other end is connected with the metal structure 15 via bolt and nut.

Refer to FIG. 1, the full bridge rectifier circuit D of the charging module 11 is composed of four high-voltage rectifier silicon stacks; the electric energy storage module 12 comprises a current limiting resistor R and a high-voltage pulse capacitor bank Cn, the current limiting resistor R is capable of limiting a current protection of the capacitor bank Cn and of changing a charging time of the capacitor bank Cn by changing a resistance value of the current limiting resistor R; the adjustable inductance L1 of the discharge module 13 is used to adjust the inductance of the discharge circuit to generate pulse oscillation waveform; the pulse current sampling measurement module 14 includes a shunt BTS and the oscilloscope 9, the shunt BTS is used to detect the current in the discharge module 13, and the oscilloscope 9 displays the current waveform of a high-energy electrical pulse generated via the discharge module 13.

Figure 8:
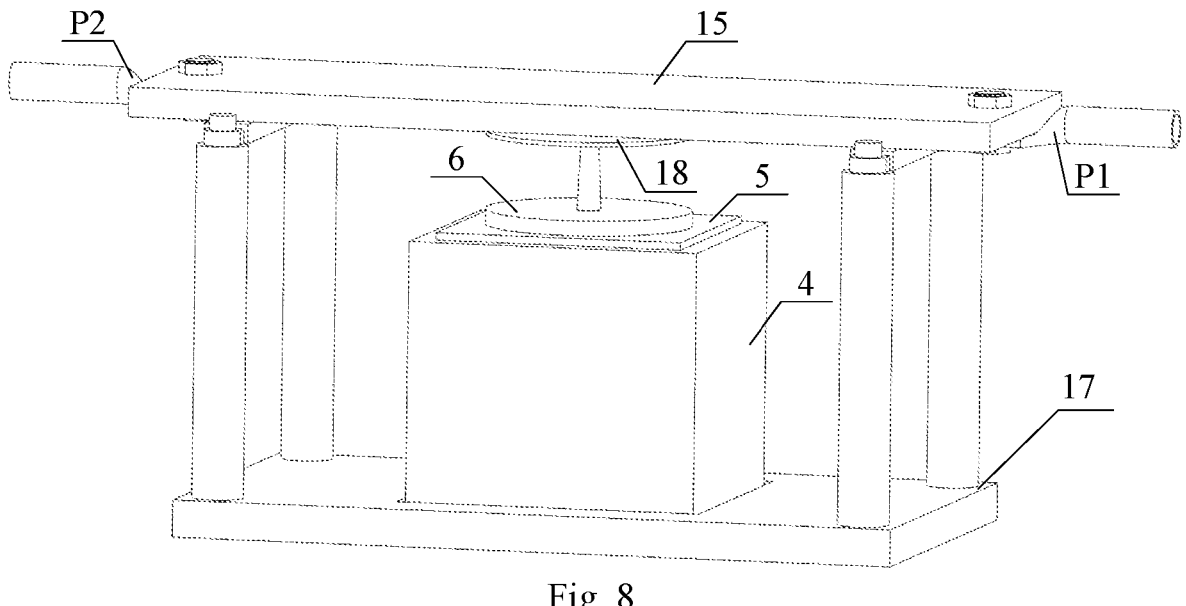
FIG. 8 is the second clamping device assembly diagram of the electro-vibration coupled stress relief system of the present invention.
Figure 9:
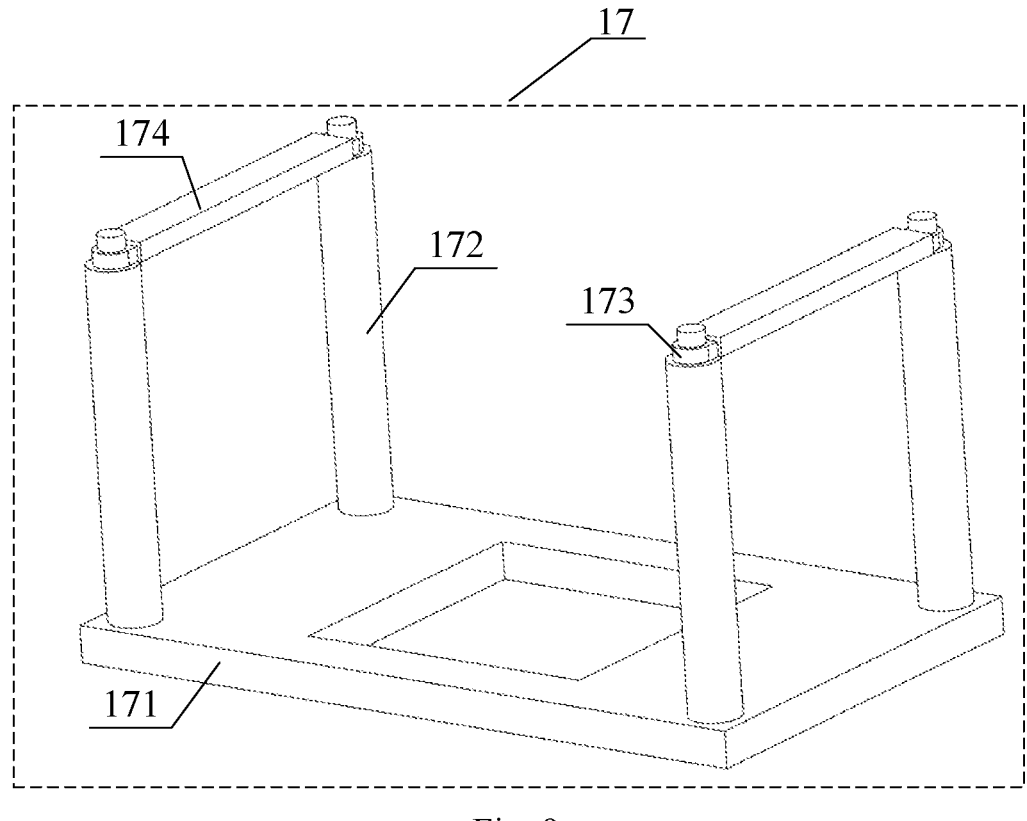
FIG. 9 is the second clamping device of the electro-vibration coupled stress relief system of the present invention.
Figure 10:
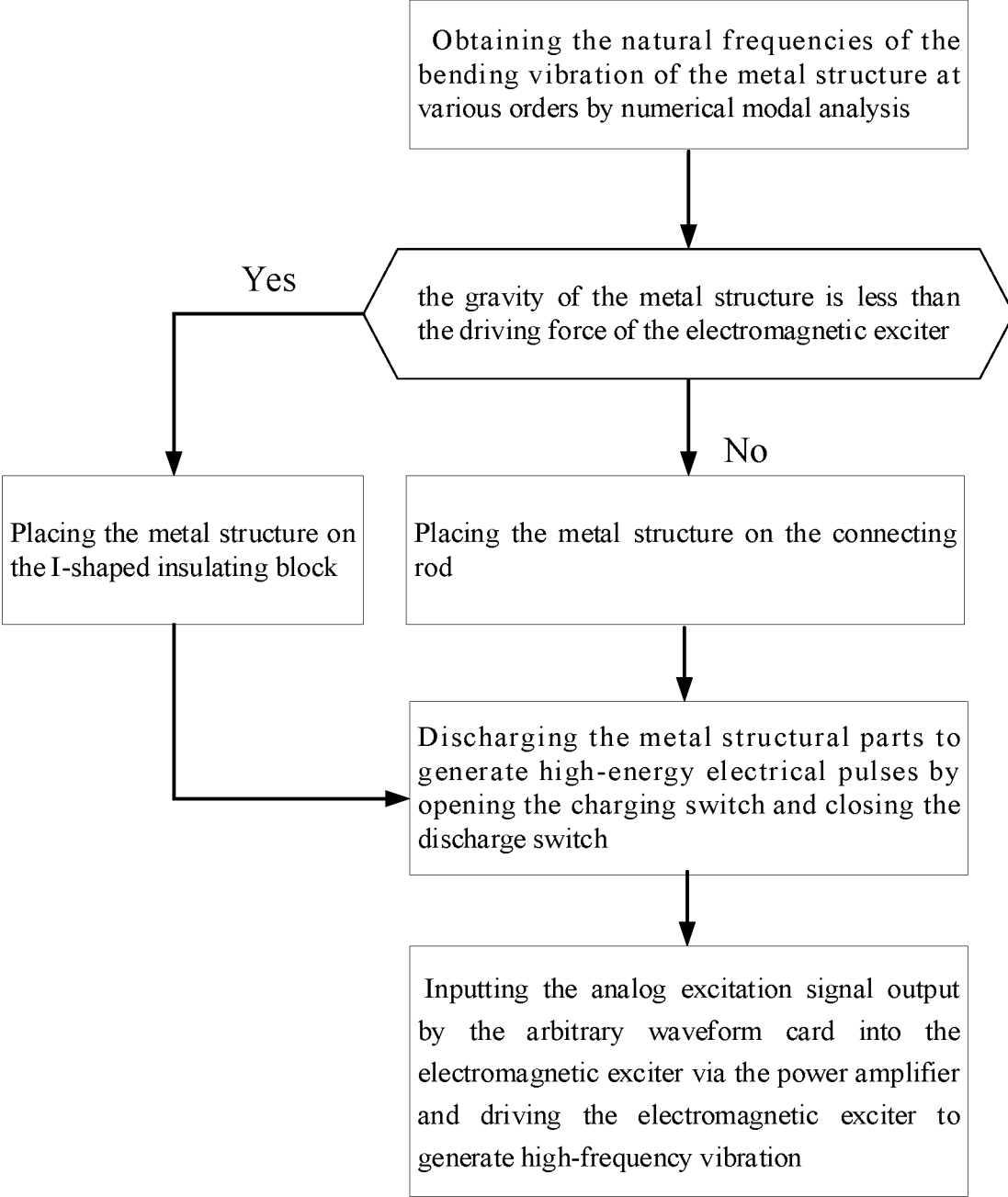
FIG. 10 is electro-vibration coupled stress relief flow chart.

The method for eliminating residual stress by using an electro-vibration coupled stress relief system of the present invention comprises the following steps:

step 1, refer to FIG. 1, establishing a finite element model of the metal structure 15 by a finite element software in the host computer 1 before an electro-vibration coupled stress relief treatment of the metal structure 15, obtaining natural frequencies of the bending vibration of the metal structure 15 at various orders by numerical modal analysis of the metal structure 15; proceeding to step 2 on condition that the gravity of the metal structure 15 is less than a driving force of the electromagnetic exciter 4; otherwise proceeding to step 4;

step 2, refer to FIG. 2, FIG. 4, FIG. 5, FIG. 6 and FIG. 7, constructing a first clamping device 16: mounting a rotary handle 162 in the form of a cylinder at one end of a pressure rod 161, connecting an insulating pressure block 163 with the other end of the pressure rod 161 in the form of a thread, connecting a ring sleeve 1641 on a 7-shaped boss with the pressure rod 161 in the form of a thread, a bolt 19 passes through the through hole 1642 of the inverted T-shaped boss, fixing a support column 164 on a workbench 601 of the energy amplification device 6, connecting the I-shaped insulating block 165 with the T-shaped slot 1642 via sliding connection;

step 3, refer to FIG. 2, FIG. 4, FIG. 5 and FIG. 6, placing the metal structure 15 on the I-shaped insulating block 165 via the clamping device, turning the rotary handle 162 to drive the pressure rod to move downward; proceeding to step 4, the insulating pressure block 163 is in close contact with the upper surface of the metal structure 15 to achieve the locking function, so as to fix the metal structure 15 on the workbench 601 of the energy amplification device 6; proceeding to step 6;

step 4, refer to FIG. 3, FIG. 4, FIG. 8 and FIG. 9, constructing a second clamping device 17: providing an insulating bottom plate 18 between the workbench 601 and the metal structural 15, the lower surface of the metal structure 14 is in close contact with the workbench 601 of the energy amplification device 6, and the gravity of the metal structure 15 is borne by the support platform 603, so as to avoid the failure of the electromagnetic exciter 4 due to the excessive gravity of the metal structure 15, placing the electromagnetic exciter 4 in a square groove of the bottom plate 171, connecting a support rod 172 and the bottom plate 171 in the form of a thread, connecting a connecting rod 173 and the support rod 172 via sliding connection, and fixing an insulated U-shaped plate 174 on the connecting rod 173;

step 5, refer to FIG. 8 and FIG. 9, placing the metal structural 15 on the insulating U-shaped plate 174;

step 6, refer to FIG. 1, controlling the power switch K0 and the charging switch K1 to close, opening the discharge switch K2, charging the electric energy storage module 12, opening the charging switch K1 after the electric energy storage module 12 is fully charged, closing the discharge switch K2, converting the digital excitation signal into the analog excitation signal via the arbitrary waveform card 2, outputting the analog excitation signal by the arbitrary waveform card 2 is inputted into the electromagnetic exciter 4 via the power amplifier 3, driving the electromagnetic exciter 4 to generate high-frequency vibration, realizing the electro-vibration coupling stress relief treatment of the metal structural 15.

Description of the embodiments of the present specification is merely an enumeration of the implementation forms of the inventive concept of the present invention, which shall not be construed as limiting the scope of the present invention to the specific forms expressed in the embodiments. Equivalent technical solutions that a skilled person of the art may construct from the conception of the present invention shall fall under the scope of the present invention.

What is claimed is:

1. A method for eliminating residual stress by using an electro-vibration coupled stress relief system, the electro-vibration coupled stress relief system for eliminating residual stress comprising a host computer, an arbitrary waveform card, a power amplifier, an electromagnetic exciter, an energy amplification device, an acceleration sensor, a charge amplifier, an oscilloscope, a power module, a charging module, an electric energy storage module, a discharge module, a pulse current sampling measurement module, a first copper electrode and a second copper electrode; the host computer converting a digital excitation signal into an analog excitation signal via the arbitrary waveform card, and the analog excitation signal being inputted into the electromagnetic exciter via the power amplifier; the energy amplification device being composed of a workbench, a frustum shaped connecting rod and a support platform; the workbench being connected with the support platform via the frustum shaped connecting rod; a cross sectional area of the frustum shaped connecting rod is less than a cross sectional area of the workbench, the cross sectional area of the frustum shaped connecting rod is less than a cross sectional area of the support platform; a length of the frustum shaped connecting rod is greater than a thickness of the workbench, a big end of the frustum shaped connecting rod being connected to the support platform, and a small end thereof being connected to the workbench, the support platform being fixed on an exciting table of a moving part of the electromagnetic exciter; the acceleration sensor being fixed on a lower surface of the workbench, the acceleration sensor being connected with the charge amplifier input channel, the charge amplifier output channel being connected with the oscilloscope input channel, and the oscilloscope output channel being connected with the host computer; the power module being arranged with a power switch and a step-up transformer, an input end of the step-up transformer being externally connected with a power frequency power supply via the power switch, an output end of the step-up transformer of the power module being connected with the input end of a full bridge rectifier circuit of the charging module, and a positive output end of the full bridge rectifier circuit of the charging module being connected with a charging switch, a negative output end of the full bridge rectification circuit of the charging module being connected with a negative input end of the electric energy storage module, the charging switch of the charging module being connected with a positive input end of the electric energy storage module, and a positive output end of the electric energy storage module being connected with a discharge switch of the discharge module, a negative output end of the electric energy storage module being connected with an adjustable inductance of the discharge module, the discharge switch of the discharge module being connected with the pulse current sampling measurement module, one end of the first copper electrode being connected with the pulse current sampling measurement module via cold pressing technology, and the other end being connected with a metal structure via bolt and nut; one end of the second copper electrode being connected with the adjustable inductance via cold pressing technology, and the other end being connected with the metal structure via bolt and nut; the full bridge rectifier circuit of the charging module being composed of four high-voltage rectifier silicon stacks; the electric energy storage module comprises a current limiting resistor and a high-voltage pulse capacitor bank, the current limiting resistor is capable of limiting a current protection of the capacitor bank and of changing a charging time of the capacitor bank by changing a resistance value of the current limiting resistor; the adjustable inductance of the discharge module being used to adjust an inductance of the discharge circuit to generate pulse oscillation waveform; the pulse current sampling measurement module includes a shunt and the oscilloscope, the shunt being used to detect the current in the discharge module, and the oscilloscope displays a current waveform of a high-energy electrical pulse generated via the discharge module; wherein, the method for eliminating residual stress comprise the following steps:

step 1: establishing a finite element model of the metal structure by a finite element software in the host computer prior to an electro-vibration coupled stress relief treatment of the metal structure, obtaining natural frequencies of a bending vibration of the metal structure at various orders by numerical modal analysis of the metal structure; proceeding to step 2 on condition that a gravity of the metal structure is less than a driving force of the electromagnetic exciter; otherwise proceeding to step 4;

step 2: constructing a first clamping device: mounting a rotary handle in the form of a cylinder at one end of a pressure rod, connecting an insulating pressure block with the other end of the pressure rod in the form of a thread, connecting a ring sleeve on a 7-shaped boss with the pressure rod in the form of a thread, fixing a support column on a workbench of the energy amplification device, connecting an I-shaped insulating block with a T-shaped slot via sliding connection;

step 3: placing the metal structure on the I-shaped insulating block via the first clamping device, turning the rotary handle to drive the pressure rod to move downward, proceeding to step 6;

step 4: constructing a second clamping device: providing an insulating bottom plate between the workbench and the metal structure, placing the electromagnetic exciter in a square groove of the bottom plate, connecting a support rod and the bottom plate in the form of a thread, connecting a connecting rod and the support rod via sliding connection, and fixing an insulated U-shaped plate on the connecting rod;

step 5: placing the metal structure on the insulating U-shaped plate;

step 6: closing the power switch and the charging switch, opening the discharge switch; charging the electric energy storage module, opening the charging switch after the electric energy storage module is fully charged, closing the discharge switch; converting the digital excitation signal into the analog excitation signal via the arbitrary waveform card, outputting the analog excitation signal by the arbitrary waveform card is inputted into the electromagnetic exciter via the power amplifier, driving the electromagnetic exciter to generate high-frequency vibration.

* * * * *